United States Patent
Sato

(10) Patent No.: US 11,384,839 B2
(45) Date of Patent: Jul. 12, 2022

(54) SEALING DEVICE

(71) Applicant: NOK CORPORATION, Tokyo (JP)

(72) Inventor: Yuki Sato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 48 days.

(21) Appl. No.: 15/680,205

(22) Filed: Aug. 18, 2017

(65) Prior Publication Data

US 2018/0058585 A1 Mar. 1, 2018

(30) Foreign Application Priority Data

Aug. 30, 2016 (JP) .............................. JP2016-168364

(51) Int. Cl.
| | |
|---|---|
| *F16J 15/3212* | (2016.01) |
| *F16J 15/3216* | (2016.01) |
| F16J 15/3204 | (2016.01) |
| F16J 15/3252 | (2016.01) |

(52) U.S. Cl.
CPC ....... *F16J 15/3212* (2013.01); *F16J 15/3216* (2013.01); *F16J 15/3204* (2013.01); *F16J 15/3252* (2013.01)

(58) Field of Classification Search
CPC .. F16J 15/3212; F16J 15/3252; F16J 15/3204; F16J 15/3208; Y10T 29/4998
See application file for complete search history.

(56) References Cited

U.S. PATENT DOCUMENTS

| | | | | |
|---|---|---|---|---|
| 2,434,485 A | * | 1/1948 | Chambers, Jr. ...... | F16J 15/3212 277/555 |
| 2,692,786 A | * | 10/1954 | Reynolds ............. | F16J 15/3248 277/573 |
| 2,719,045 A | * | 9/1955 | Grubenmann ....... | F16J 15/3252 277/577 |
| 2,736,584 A | * | 2/1956 | Riesing ................ | F16J 15/3248 277/573 |
| 2,816,784 A | * | 12/1957 | Stucke ................. | F16J 15/3212 277/554 |
| 2,868,566 A | * | 1/1959 | Kosatka ............... | F16J 15/3252 277/565 |
| 3,495,843 A | * | 2/1970 | Andersen ............. | F16J 15/3216 277/505 |
| 3,743,305 A | * | 7/1973 | Berens ................. | F16C 33/78 277/565 |

(Continued)

FOREIGN PATENT DOCUMENTS

| | | | |
|---|---|---|---|
| DE | 1960937 U | * | 3/1967 |
| JP | 3278349 B2 | | 4/2002 |

*Primary Examiner* — Eugene G Byrd
(74) *Attorney, Agent, or Firm* — Harness, Dickey & Pierce, P.L.C.

(57) ABSTRACT

A sealing apparatus 1 is provided with a reinforcing ring 10 that is a member that is annular around an axis x, an elastic-body portion 20 that is formed from an elastic body that is annular around the axis x, an annular garter spring 30, and a lip-pressing ring 40 that is an annular member. The lip-pressing ring 40 is configured so that a seal lip 21 can be inserted into a space on an inner-periphery side thereof, and a value of an inner diameter thereof is configured to be a size no less than a value of an outer diameter of an annular portion that is at least a portion on an outer-periphery side of the seal lip 21. The sealing apparatus can suppress a decrease in tracking a rotary shaft.

6 Claims, 4 Drawing Sheets

(56) References Cited

U.S. PATENT DOCUMENTS

| | | | | |
|---|---|---|---|---|
| 3,924,861 | A * | 12/1975 | Szepesvary | F16J 15/3252 |
| | | | | 277/551 |
| 4,015,883 | A * | 4/1977 | Taylor | F16C 33/7876 |
| | | | | 277/573 |
| 4,102,538 | A * | 7/1978 | Bertin | F16J 15/3204 |
| | | | | 277/565 |
| 4,172,599 | A * | 10/1979 | Forch | F16J 15/322 |
| | | | | 277/552 |
| 4,195,854 | A * | 4/1980 | Bertin | F16J 15/3216 |
| | | | | 277/549 |
| 4,274,641 | A * | 6/1981 | Cather, Jr. | F16J 15/322 |
| | | | | 277/309 |
| 4,326,723 | A * | 4/1982 | Arai | F16J 15/3276 |
| | | | | 277/565 |
| 4,553,763 | A * | 11/1985 | Ehrmann | F16J 15/3224 |
| | | | | 277/561 |
| 4,981,303 | A * | 1/1991 | Matsushima | F16J 15/3264 |
| | | | | 277/351 |
| 5,085,444 | A * | 2/1992 | Murakami | B60G 7/00 |
| | | | | 277/503 |
| 8,002,287 | B2 * | 8/2011 | Wagner | F16L 5/10 |
| | | | | 277/551 |
| 8,668,390 | B2 * | 3/2014 | Schweitzer | F16J 15/3212 |
| | | | | 384/484 |
| 2003/0173746 | A1 * | 9/2003 | Ramsay | F16J 15/008 |
| | | | | 277/549 |
| 2013/0322791 | A1 * | 12/2013 | Dlugai | F16J 15/164 |
| | | | | 384/91 |

\* cited by examiner

SEALING DEVICE

CROSS-REFERENCE TO RELATED APPLICATIONS

This application claims the benefit and priority of Japanese Application No. 2016-168364, filed Aug. 30, 2016. The entire disclosure of the above application is incorporated herein by reference.

FIELD

The present disclosure relates to a sealing apparatus and relates particularly to a sealing apparatus used for a rotary shaft of an automobile, a general-purpose machine, or the like.

BACKGROUND

Conventionally, in an engine of, for example, a vehicle, a sealing apparatus is used to provide a seal between a rotary shaft and a through hole of a housing through which this rotary shaft is inserted. FIG. 4 is a cross-sectional view of a cross section at an axis for illustrating a schematic configuration of one example of a conventional sealing apparatus. As illustrated in FIG. 4, a conventional sealing apparatus 100 has an elastic-body portion 102 comprised of an elastic body formed integrally with a reinforcing ring 101 made of metal, and the elastic-body portion 102 is formed with a seal lip 103 and a dust lip 104. The seal lip 103 is formed on an inner-periphery side with lip tip portion 105 of a wedge-shaped cross section that is convex toward the axis and is formed on an outer-periphery side with an annular receiving groove 106 that faces away from the lip tip portion 105 and is concave toward the inner-periphery side. An annular garter spring 107 is embedded in this receiving groove 106, and the garter spring 107, in a usage state of the sealing apparatus 100, presses the lip tip portion 105 to the rotary shaft and imparts to the lip tip portion 105 a tension force against the rotary shaft. By this garter spring 107, improving tracking of the rotary shaft by the seal lip 103 is attempted (for example, see patent literature 1).

CITATION LIST

Patent Literature

[Patent Literature 1] JP 3278349

SUMMARY

Technical Problem

As described above, in the conventional sealing apparatus 100, improving tracking of the rotary shaft by the seal lip 103 is attempted by the garter spring 107; however, in a situation where the sealing apparatus 100 is used in a low-temperature environment, an influence of the garter spring 107 may weaken because the seal lip 103 becomes brittle, the tension force arising in the sealing lip 103 may decrease, and the tracking of the rotary shaft by the seal lip 103 may decrease. When the tracking of the rotary shaft by the seal lip 103 decreases, a gap may arise between the rotary shaft and the lip tip portion 105 such that an object of sealing leaks from this gap.

In this manner, in the conventional sealing apparatus 100, a configuration is sought whereby a decrease in the tracking of the rotary shaft by the seal lip 103 can be suppressed even in a situation of use in a low-temperature environment.

The present disclosure is made in view of the problems described above and has as an object to provide a sealing apparatus that can suppress a decrease in tracking a rotary shaft.

Solution to Problem

To achieve the object above, a sealing apparatus according to the present disclosure is provided with a reinforcing ring that is annular around an axis; an elastic-body portion that is provided with a seal lip, is installed to the reinforcing ring, is formed from an elastic body, and is annular around the axis; an annular garter spring; and a lip-pressing ring that is an annular member; wherein the seal lip has on an inner-periphery side a lip tip portion that is an annular portion that is convex toward the axis, and on an outer-periphery side a receiving groove that is an annular groove formed facing away from the lip tip portion; the garter spring is embedded in the receiving groove of the seal lip; and the lip-pressing ring is configured so the seal lip can be inserted into a space on the inner-periphery side of the lip-pressing ring, a value of an inner diameter of the lip-pressing ring being no less than a value of an outer diameter of an annular portion that is at least a portion on the outer-periphery side of the seal lip.

In a sealing apparatus according to one aspect of the present disclosure, the seal lip is connected to another portion of the elastic-body portion at an end portion on one side in an axis direction, the value of the inner diameter of the lip-pressing ring being no less than a value of an outer diameter of the seal lip at a portion at least partway toward the one side from another side in the axis direction.

In a sealing apparatus according to one aspect of the present disclosure, the lip-pressing ring is a member that is annular around an axis of the lip-pressing ring.

In a sealing apparatus according to one aspect of the present disclosure, the inner diameter of the lip-pressing ring is set so the inner-periphery side of the lip-pressing ring contacts the outer-periphery side of the seal lip before the seal lip is spread to the outer-periphery side by a distance corresponding to an interference of the seal lip.

In a sealing apparatus according to one aspect of the present disclosure, the inner diameter of the lip-pressing ring is set so the inner-periphery side of the lip-pressing ring contacts the outer-periphery side of the seal lip in a usage state.

In a sealing apparatus according to one aspect of the present disclosure, in a cross section at the axis, at least a portion of an outline on the inner-periphery side of the lip-pressing ring corresponds to at least a portion of an outline on the one side of the receiving groove on the outer-periphery side of the seal lip.

Advantageous Effects of the Disclosure

According to the sealing apparatus according to the present disclosure, a decrease in tracking a rotary shaft can be suppressed.

DRAWINGS

DETAILED DESCRIPTION

An embodiment of the present disclosure is described below with reference to the drawings.

Figure 1:
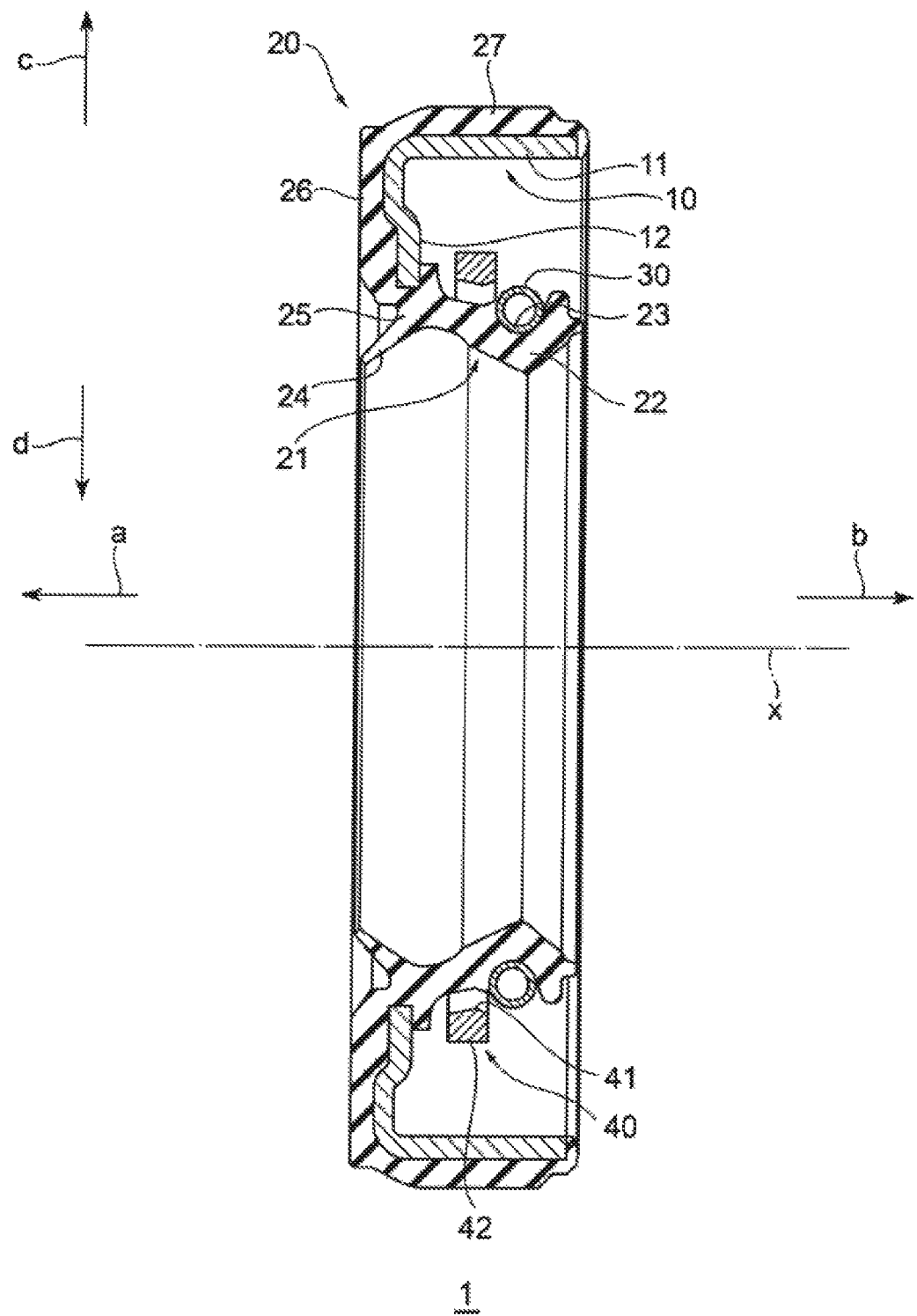
FIG. 1 is a cross-sectional view of a cross section at an axis for illustrating a schematic configuration of a sealing device according to an embodiment of the present disclosure.
Figure 2:
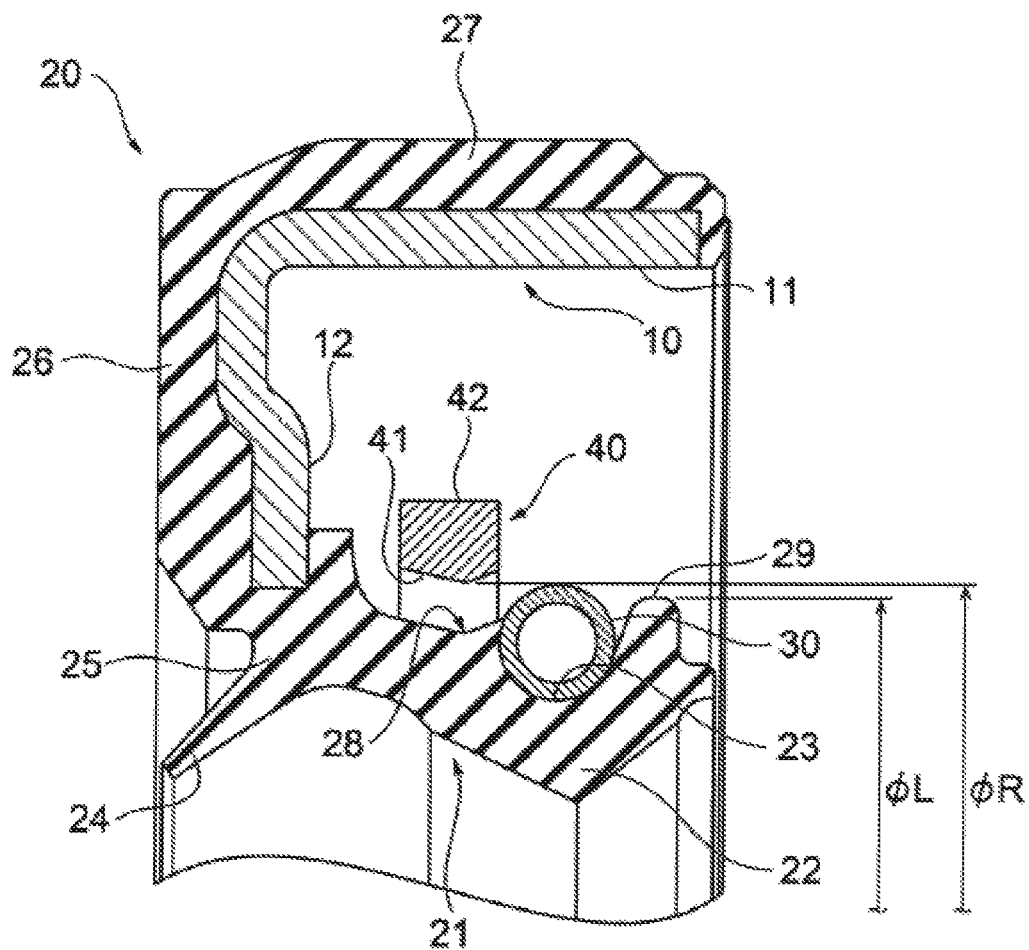
FIG. 2 is a partial enlarged cross-sectional view of a cross section at an axis x of the sealing apparatus illustrated in FIG. 1.

FIG. 1 is a cross-sectional view of a cross section at an axis x for illustrating a schematic configuration of a sealing apparatus 1 according to an embodiment of the present disclosure, and FIG. 2 is a partial enlarged cross-sectional view of a cross section at the axis x of the sealing apparatus 1 illustrated in FIG. 1. The sealing apparatus 1 according to an embodiment of the present disclosure is used in an automobile, a general-purpose machine, or the like to provide a seal between a rotary shaft and a member having a through hole through which this rotary shaft is inserted, and is applied to, for example, provide a seal between a crankshaft and a front cover in an automobile engine. Hereinbelow, for convenience in description, the direction of arrow a (see FIG. 1) in an axis-x direction is defined as an outer side (one side) and the direction of arrow b (see FIG. 1) in the axis-x direction is defined as an inner side (other side). More specifically, the outer side is a side of an object of non-sealing and an atmosphere side that ensures an absence of an object of sealing, and the inner side is a side of the object of sealing and a side that faces the object of sealing, such as oil. Moreover, in a direction perpendicular to the axis x (also "radial direction" hereinbelow), a direction heading away from the axis x (the direction of arrow c in FIG. 1) is defined as an outer-periphery side and a direction approaching the axis x (the direction of arrow d in FIG. 1) is defined as an inner-periphery side.

As illustrated in FIG. 1, the sealing apparatus 1 is provided with a reinforcing ring 10 that is an annular member around the axis x, an elastic-body portion 20 formed from an elastic body that is annular around the axis x, an annular garter spring 30, and a lip-pressing ring 40 that is an annular member. The elastic-body portion 20 is installed integrally to the reinforcing ring 10. The reinforcing ring 10 is, for example, made of metal; metal material of the reinforcing ring 10, there is, for example, stainless steel and SPCC (cold-rolled steel). As the elastic body of the elastic-body portion 20, there is, for example, various types of rubber materials. As the various types of rubber materials, there is, for example, synthetic rubbers such as nitrile rubber (NBR), hydrogenated nitrile rubber (H-NBR), acrylic rubber (ACM), and fluororubber (FKM).

The reinforcing ring 10 is manufactured by, for example, pressing or forging, and the elastic-body portion 20 is molded by crosslinking molding (vulcanization) using a molding die. At a time of this crosslinking molding, the reinforcing ring 10 is disposed in the molding die; the elastic-body portion 20 is adhered to the reinforcing ring 10 by crosslinking adhesion, and the elastic-body portion 20 is molded integrally with the reinforcing ring 10.

For example, as illustrated in FIG. 1, the reinforcing ring 10 is formed annularly around the axis x, a cross section at the axis x (also simply "cross section" hereinbelow) exhibiting a shape that is substantially L-shaped, and has a cylindrical portion 11 that is a cylindrical portion or a substantially cylindrical portion extending in the axis-x direction and a flange portion 12 that is a hollow, disk-shaped portion spreading from an outer-side end portion of the cylindrical portion 11 toward the inner-periphery side. Moreover, the cross section of the reinforcing ring 10 has a constant or substantially-constant thickness.

The elastic-body portion 20 is installed to the reinforcing ring 10 and, in the present embodiment, is formed integrally with the reinforcing ring 10 so as to cover the reinforcing ring 10 from the outer side and the outer-periphery side. As illustrated in FIG. 1, the elastic-body portion 20 has a seal lip 21, and the seal lip 21 has on the inner-periphery side an annular lip tip portion 22 that is convex toward the axis x, and on the outer-periphery side an annular receiving groove 23 formed facing away from the lip tip portion 22. Specifically, as illustrated in FIG. 1, the elastic-body portion 20 has in addition to the seal lip 21 a dust lip 24 and a lip base portion 25. The lip base portion 25 is, in the elastic-body portion 20, an annular portion positioned in a vicinity of an inner-periphery-side end portion of the flange portion 12 of the reinforcing ring 10; the seal lip 21 is connected to the lip base portion 25 at an outer-side end portion, is a portion extending from the lip base portion 25 toward the inner side, and is disposed opposing the cylindrical portion 11 of the reinforcing ring 10. The dust lip 24 extends from the lip base portion 25 to the outer side and toward the axis x.

Specifically, the seal lip 21 has on an inner-side end portion the lip tip portion 22, which is wedge-shaped and annular and whose cross-sectional shape is convex toward the inner-periphery side. The lip tip portion 22 is formed so in a usage state, an inner-periphery-side pointed portion makes close contact with an outer peripheral surface of the rotary shaft, which is not illustrated. More specifically, an interference of the lip tip portion 22 against the rotary shaft is set so the lip tip portion 22 contacts the outer peripheral surface of the rotary shaft that is not illustrated across a predetermined width in the axis-x direction. Note that the lip tip portion 22 may be formed with a spiral protrusion or groove that enables formation of an airflow toward a side of the object of sealing (inner side) in an attempt to prevent leaking of the object of sealing.

Furthermore, as illustrated in FIG. 2, an outer-periphery-side outline of a cross section of the seal lip 21 extends from the receiving groove 23 toward the outer side—diagonally from an inner-side rim of the receiving groove 23 to the inner-periphery side—and, upon reaching a lowest point positioned farthest on the inner-periphery side, extends diagonally to the outer-periphery side and reaches the lip base portion 25. A shape of the outer-periphery-side outline of the cross section of the seal lip 21 is not limited to the shape described above and may be another shape; for example, the outline may be a curve, a straight line, or a combination of a curve and a straight line.

Specifically, the dust lip 24 is a part that extends from the lip base portion 25, extending from the lip base portion 25 in outer-side and inner-periphery-side directions. By the dust lip 24, attempted is prevention of intrusion of foreign matter such as mud water, sand, or dust from the outer side in a lip-tip-portion 22 direction in the usage state. The dust lip 24 may have a length in this extending direction set so a tip portion thereof contacts the rotary shaft that is not illustrated in the usage state, and may have the length in the extending direction thereof set so the tip portion thereof does not contact the rotary shaft that is not illustrated in the usage state.

Furthermore, the elastic-body portion 20 has a rear cover 26 and a gasket portion 27. The rear cover 26 is a portion that covers from the outer side the flange portion 12 of the reinforcing ring 10, and the gasket portion 27 is a portion that covers from the outer-periphery side the cylindrical portion 11 of the reinforcing ring 10. The gasket portion 27 is a portion for fixing, in the usage state, the sealing apparatus 1 in the through hole of the member that is not illustrated through which the rotary shaft is inserted and, when the sealing apparatus 1 is pressed into the through hole described above, is compressed in the radial direction between this through hole and the cylindrical portion 11 of the reinforcing ring 10 and generates a mating force that is a force in the radial direction. The gasket portion 27 has a thickness in the radial direction set so a mating force of a predetermined size arises when the sealing apparatus is pressed into the through hole. As described above, the elastic-body portion 20 has portions that are the seal lip 21, the dust lip 24, the lip base portion 25, the rear cover 26, and the gasket portion 27, and is formed integrally from the elastic body.

The garter spring 30 is an annular coil spring and is formed by, for example, end portions of the coil spring being joined together. The garter spring 30 is embedded in the receiving groove 23 of the seal lip 21. In the usage state, the garter spring 30 presses the lip tip portion 22 of the seal lip 21 to the inner-periphery side in the radial direction and presses the lip tip portion 22 to the rotary shaft, imparting a tension force of a predetermined size to the lip tip portion 22 against the rotary shaft. When the rotary shaft is inserted into the sealing apparatus 1 and the seal lip 21 is spread to the outer-periphery side in correspondence with the interference, the garter spring 30 is spread to the outer-periphery side and stretched in a peripheral direction, generating an elastic force and pressing the lip tip portion 22 to the rotary shaft. In a free state of the seal lip 21 where the rotary shaft is not inserted into the sealing apparatus 1, the garter spring 30 is at a natural length and generates no elastic force. Moreover, the garter spring 30 may be configured to be stretched to generate an elastic force and bias the seal lip 21 to the inner-periphery side in the free state of the seal lip 21 as well.

The lip-pressing ring 40 is a resin or metal annular member; it is configured so the seal lip 21 can be inserted into a space on the inner-periphery side of the lip-pressing ring 40, and a value of an inner diameter of the lip-pressing ring 40 is made to be a size that is no less than a value of an outer diameter of an annular portion that is at least a portion, on the outer-periphery side, of the seal lip 21. As described below, the lip-pressing ring 40 is installed in the sealing apparatus 1 so that in the usage state the seal lip 21 is inserted therein and so as to surround from the outer-periphery side a portion of the seal lip 21 across the axis-x direction.

Specifically, the lip-pressing ring 40 is a member that is annular around an axis thereof (axis x in FIGS. 1, 2) and is formed with a ring inner-peripheral surface 41 that is a surface on the inner-periphery side, and a ring outer-peripheral surface 42 that is a surface on the outer-periphery side so outlines on the outer-periphery side and the inner-periphery side draw a perfect circle or a substantially-perfect circle in a cross section orthogonal to the axis. Moreover, the value of the inner diameter of the lip-pressing ring 40 is made to be a size that is no less than a value of an outer diameter of the seal lip 21 at a portion at least partway toward the outer side (one side) in the axis-x direction from the inner-side end portion.

More specifically, as illustrated in FIG. 2, an inner diameter φR that is a minimum inner diameter of the ring inner-peripheral surface 41 of the lip-pressing ring 40 is made to be a value no less than an outer diameter φL that is a maximum outer diameter in a portion between an inner-side end portion and a predetermined position on the outer side of the receiving groove 23 on a seal lip outer-peripheral surface 28 that is an outer-periphery-side surface of the seal lip 21. By this, the seal lip 21 can be inserted inside the lip-pressing ring 40 from an outer-side end portion. Moreover, so the seal lip 21 can be inserted inside the lip-pressing ring 40 from the outer-side end portion, a diameter of the ring outer-peripheral surface 42 of the lip-pressing ring 40 is set to be smaller than an inner diameter of a portion of the sealing apparatus 1 opposing the seal lip 21 on the outer-periphery side. In the present embodiment, the diameter of the ring outer-peripheral surface 42 of the lip-pressing ring 40 is set to be smaller than an inner diameter of the cylindrical portion 11 of the reinforcing ring 10.

Furthermore, more specifically, as illustrated in FIGS. 1, 2, with the lip-pressing ring 40, a shape of a cross section at the axis of the lip-pressing ring 40 is made to be substantially rectangular or substantially pentagonal; the ring inner-peripheral surface 41 has a wedge-shaped cross-sectional shape, having a convex tapered surface on the inner-periphery side, and the ring outer-peripheral surface 42 is made to be a cylindrical surface or a substantially-cylindrical surface around the axis. In the present embodiment, for example, as illustrated in FIG. 2, on the seal lip outer-peripheral surface 28 of the seal lip 21, a portion on the inner side of the receiving groove 23 forms a protruding portion 29 that is an annular portion protruding in an outer-periphery direction; a diameter of the seal lip outer-peripheral portion 28 is maximal at the protruding portion 29. That is, diameters of portions other than the protruding portion 29 in the seal lip outer-peripheral surface 28 are less than the diameter of the protruding portion 29, the diameter of the protruding portion 29 having the outer diameter φL (φL≤φR). Because of this, in a situation where the lip-pressing ring 40 is disposed coaxially with the seal lip 21, an annular space is formed between the ring inner-peripheral surface 41 of the lip-pressing ring 40 and the portions other than the protruding portion 29 in the seal lip outer-peripheral surface 28 of the seal lip 21.

In a situation where the garter spring 30 is protruding to the outer-periphery side of the protruding portion 29 of the seal lip outer-peripheral surface 28 of the seal lip 21 in a state where the garter spring 30 is embedded in the receiving groove 23 of the seal lip 21, the seal lip 21 may not be able to be inserted into the lip-pressing ring 40 past the receiving groove 23. In this situation, by inserting the seal lip 21 into the lip-pressing ring 40 in a state where the garter spring 30 is not installed in the receiving groove 23 of the seal lip 21 and afterward installing the garter spring 30 in the receiving groove 23 of the seal lip 21, the seal lip 21 can be inserted into the lip-pressing ring 40 past the receiving groove 23.

Furthermore, with the ring inner-peripheral surface 41 of the lip-pressing ring 40, at least a portion of the outline of the ring inner-peripheral surface 41 in the cross section at the axis thereof may correspond to at least a portion of an outline on an outer side of the receiving groove 23 in the cross section of the seal lip outer-peripheral surface 28 of the seal lip 21. By this, at least a portion of the ring inner-peripheral surface 41 of the lip-pressing ring 40 can be made to make close contact with at least a portion of a portion on the outer side of the receiving groove 23 in a surface of the seal lip outer-peripheral surface 28 of the seal lip 21 when the seal lip 21 is spread to the outer-periphery side and contacts the ring inner-peripheral surface 41 of the lip-pressing ring 40.

As described above, a specific example of the shape of the lip-pressing ring 40 is illustrated, but the shape of the lip-pressing ring 40 is not limited to the specific shape described above. The shape of the lip-pressing ring 40 may be a shape that differs from the specific example described above; for example, the ring inner-peripheral surface 41 may be a conical surface, a cylindrical surface, a curved surface, or the like, and the ring outer-peripheral surface 42 may be a conical surface, a curved surface, or the like. Moreover, while a specific example of the shape of the seal lip 21 is illustrated as described above, the shape of the seal lip 21 is not limited to the specific shape described above. The shape of the seal lip 21 may be a shape that differs from the specific example described above; the outer diameter does not have to be maximal at the protruding portion 29, and the outer diameter may be maximal at, for example, a portion in a vicinity of the lip base portion 25 of the seal lip 21. However, the inner diameter φR of the ring inner-peripheral surface 41 of the lip-pressing ring 40 is made to be a value no less than the outer diameter φL that is the maximum outer diameter in the portion between the inner-side end portion and the predetermined position on the outer side of the receiving groove 23 on the seal lip outer-peripheral surface 28 of the seal lip 21. Moreover, with the ring inner-peripheral surface 41 of the lip-pressing ring 40, at least a portion of the outline of the ring inner-peripheral surface 41 in the cross section at the axis thereof preferably corresponds to at least a portion of the outline on the outer side of the receiving groove 23 in the outline of the seal lip outer-peripheral surface 28 in the cross section of the seal lip 21. Moreover, the material of the ring 40 may be any material.

Furthermore, as described below, the diameter of the ring inner-peripheral surface 41 of the lip-pressing ring 40 is set so in the usage state of the sealing apparatus 1 the seal lip outer-peripheral surface 28 of the seal lip 21 spread out to the outer-periphery side contacts the ring inner-peripheral surface 41. Specifically, the inner diameter of the lip-pressing ring 40 is set so the ring inner-peripheral surface 41 of the lip-pressing ring 40 contacts the seal lip outer-peripheral surface 28 of the seal lip 21 before the seal lip 21 is spread to the outer-periphery side by a distance corresponding to the interference against the inserted rotary shaft. For example, the inner diameter of the lip-pressing ring 40 is set so the ring inner-peripheral surface 41 of the lip-pressing ring 40 contacts the seal lip outer-peripheral surface 28 of the seal lip 21 when the seal lip 21 is spread to the outer-periphery side by the distance corresponding to the interference. In this situation, by the lip-pressing ring 40, the seal lip 21 can be suppressed from spreading to the outer-periphery side without increasing a sliding resistance of the seal lip 21 in the usage state. Moreover, for example, the inner diameter of the lip-pressing ring 40 may be set so the ring inner-peripheral surface 41 of the lip-pressing ring 40 contacts the seal lip outer-peripheral surface 28 of the seal lip 21 in the course of the seal lip 21 being spread to the outer-periphery side by the distance corresponding to the interference. In this situation, in the usage state, the seal lip 21 is imparted with a tightening force against the rotary shaft by the lip-pressing ring 40 in addition to the garter spring 30.

Figure 3:
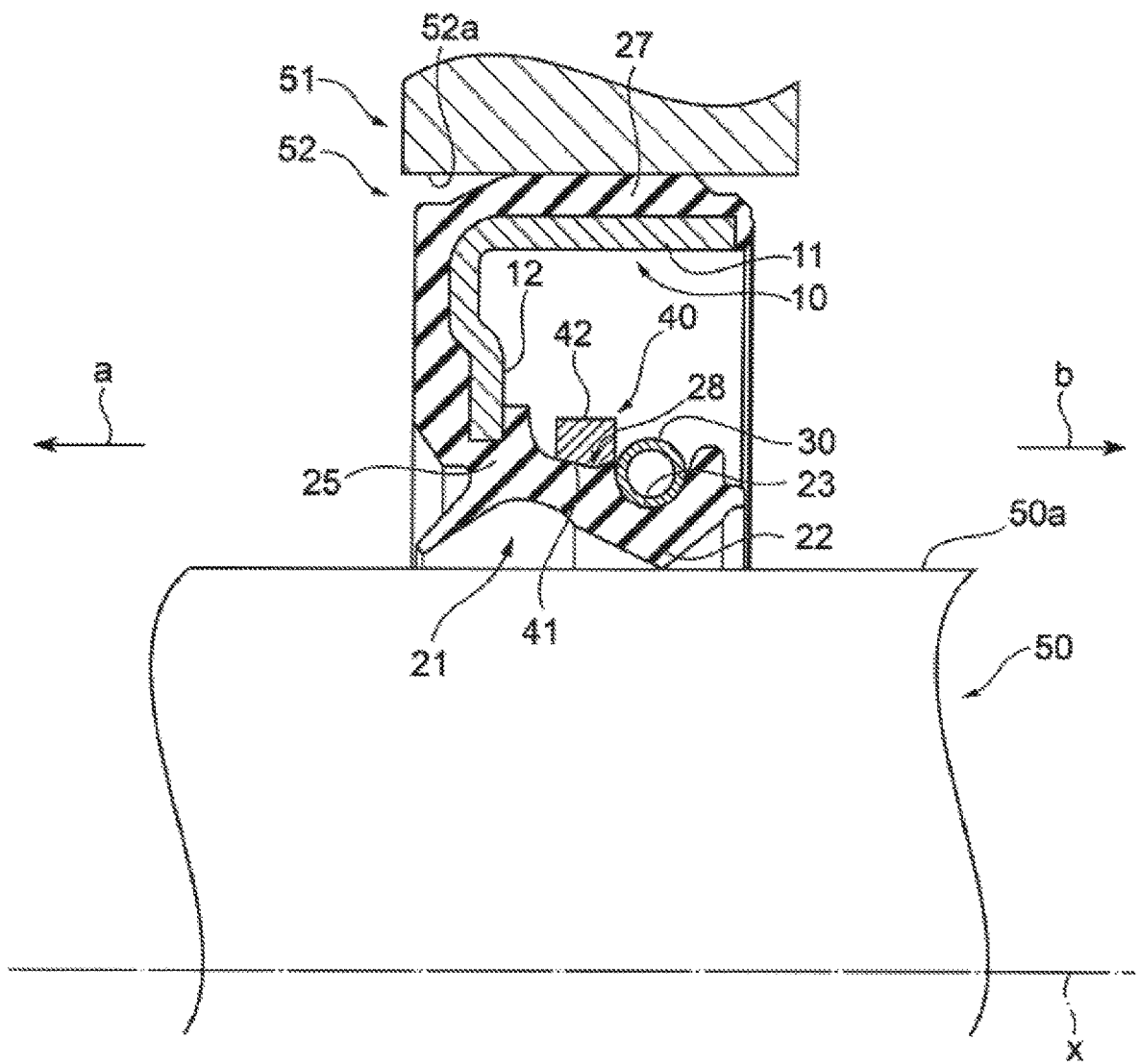
FIG. 3 is a partial cross-sectional view for illustrating the sealing apparatus according to an embodiment of the present disclosure in a usage state.
Figure 4:
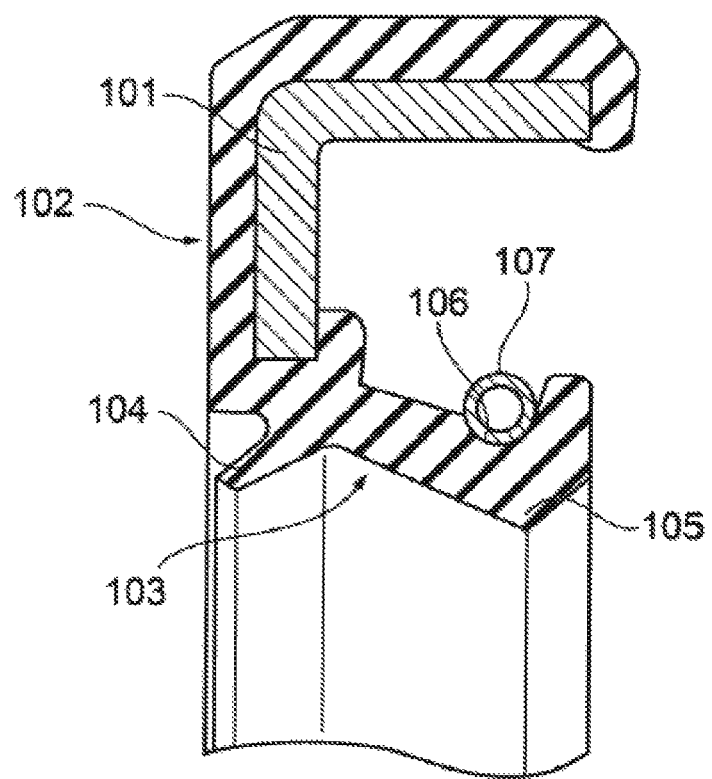
FIG. 4 is a cross-sectional view of a cross section at an axis for illustrating a schematic structure of one example of a conventional sealing apparatus.

Next, actions of the sealing apparatus 1 having the configuration described above are described. FIG. 3 is a partial cross-sectional view for illustrating the sealing apparatus 1 according to an embodiment of the present disclosure in the usage state. As illustrated in FIG. 3, the sealing apparatus 1 is installed in a space between a rotary shaft 50 and a through hole 52 to provide a seal in the usages state between the rotary shaft 50 and a housing 51 having the through hole 52 through which this rotary shaft 50 is inserted. The rotary shaft 50 is, for example, a crankshaft of an automobile engine, and the housing 51 is, for example, a front cover.

As illustrated in FIGS. 2, 3, in the sealing apparatus 1 in the usage state, the lip-pressing ring 40 has the seal lip 21 inserted therein and is disposed in a position past the garter spring 30 or the receiving groove 23 on the outer side in the axis-x direction (direction of arrow a), the ring inner-peripheral surface 41 opposing from the outer-periphery side the seal lip outer-peripheral surface 28 of the seal lip 21.

Furthermore, as illustrated in FIG. 3, in the usage state, the sealing apparatus 1 is installed pressed into the through hole 52 of the housing 51 and the gasket portion 27 of the elastic-body portion 20 is compressed between the housing 51 and the reinforcing ring 10 and abuts an inner peripheral surface 52a of the through hole 52 in a liquid-tight manner. By this, a seal is provided between the sealing apparatus 1 and the through hole 52 of the housing 51. Moreover, the lip tip portion 22 of the seal lip 21 abuts an outer peripheral surface 50a of the rotary shaft 50 in a liquid-tight manner and so the rotary shaft 50 can slide, providing a seal between the sealing apparatus 1 and the rotary shaft 50.

In the usage state, the seal lip 21 through which the rotary shaft 50 is inserted contacts the outer peripheral surface 50a of the rotary shaft 50 at the lip tip portion 22, is bent to the outer-periphery side starting from a connection point thereof to the lip base portion 25 or a portion in this vicinity, and is spread to the outer-periphery side. The seal lip 21 is spread to the outer-periphery side by a distance corresponding to an interference of the lip tip portion 22 against the rotary shaft 50. The interference is set in advance corresponding to the shape of the seal lip 21 or the shape of the lip tip portion 22 and is set to a value where, for example, the lip tip portion 22 contacts the rotary shaft 50 across a predetermined width in the axis-x direction by the seal lip 21 being pushed to the outer-periphery side.

As described above, in the usage state, the seal lip 21 has the rotary shaft 50 inserted therethrough and is spread out to the outer-periphery side, at least a portion of a portion on the outer side of the garter spring 30 of the seal lip outer-peripheral surface 28 of the seal lip 21 contacting at least a portion of the ring inner-peripheral surface 41 of the lip-pressing ring 40. As described above, in a situation where the outline of the cross section of the seal lip outer-peripheral surface 28 of the seal lip 21 matches the outline of the cross section of the ring inner-peripheral surface 41 of the lip-pressing ring 40, in the usage state, the ring inner-peripheral surface 41 of the lip-pressing ring 40 makes close contact with the seal lip outer-peripheral surface 28 of the seal lip 21.

By the ring inner-peripheral surface 41 of the lip-pressing ring 40 contacting the seal lip outer-peripheral surface 28 of the seal lip 21 in the usage state, the seal lip 21 is suppressed from spreading to the outer-periphery side by a distance greater than the distance corresponding to the interference. In a situation where the rotary shaft 50 is misaligned from the axis x, the seal lip 21 is pushed toward the outer-periphery side in a direction of misalignment, but a portion of the seal lip 21 in the direction of misalignment is pushed strongly and spreads to the outer-periphery side, and a gap arising between a portion of the seal lip 21 on an opposite side in the radial direction from this portion in the direction of misalignment and the rotary shaft 50 is suppressed. This is because the lip-pressing ring 40 is in contact with the seal lip outer-peripheral surface 28 of the seal lip 21. Even if the seal lip 21 is pushed to the outer-periphery side in one portion, the lip-pressing ring 40 is pushed to the outer-periphery side at a portion contacting this one portion of the seal lip 21 such that an entirety of the lip-pressing ring 40 is pushed to the outer-periphery side, and a portion opposing in the radial direction this one portion of the seal lip 21 is pressed in a direction of being pressed to the rotary shaft 50 by the lip-pressing ring 40. In this manner, the lip-pressing ring 40 can improve a performance of the seal lip 21 of tracking the rotary shaft 50.

The lip-pressing ring 40 has the inner diameter φR thereof set relative to the outer diameter φL of the seal lip 21 so as to contact the seal lip outer-peripheral surface 28 of the seal lip 21 before the lip tip portion 22 is spread to the outer-periphery side by the distance corresponding to the interference. In a situation where the lip-pressing ring 40 has the inner diameter φR thereof set relative to the outer diameter φL of the seal lip 21 so as to contact the seal lip outer-peripheral surface 28 of the seal lip 21 when the lip tip portion 22 is spread to the outer-periphery side by the distance corresponding to the interference—that is, in a situation where the inner diameter φR thereof is set relative to the outer diameter φL of the seal lip 21 so the lip-pressing ring 40 contacts the seal lip outer-peripheral surface 28 of the seal lip 21 when the rotary shaft 50 is inserted into the sealing apparatus 1—in the usage state, when the rotary shaft 50 is not misaligned but is rotating normally, the lip-pressing ring 40 generates no tightening force in the seal lip 21 against the rotary shaft 50. Because of this, in a situation where the lip-pressing ring 40 has the inner diameter φR thereof set relative to the outer diameter φL of the seal lip 21 so as to contact the seal lip outer-peripheral surface 28 of the seal lip 21 when the lip tip portion 22 is spread to the outer-periphery side by the distance corresponding to the interference, an increase in a sliding resistance against the rotary shaft 50 can be avoided.

Meanwhile, in a situation where the lip-pressing ring 40 has the inner diameter φR thereof set relative to the outer diameter φL of the seal lip 21 so as to contact the seal lip outer-peripheral surface 28 of the seal lip 21 in the course of the lip tip portion 22 spreading to the outer-periphery side by the distance corresponding to the interference, in the usage state, the lip-pressing ring 40 generates a tightening force in the seal lip 21 against the rotary shaft 50 by pressing the seal lip 21 to the inner-periphery side. Because of this, the lip-pressing ring 40 can increase the performance of the seal lip 21 of tracking the rotary shaft 50.

Furthermore, as illustrated in FIG. 3, in a situation where in the cross section the outline of the ring inner-peripheral surface 41 of the lip-pressing ring 40 corresponds to the outline of the seal lip outer-peripheral surface 28 of the seal lip 21, in the usage state, the lip-pressing ring 40 is housed, making close contact with the seal lip outer-peripheral surface 28 of the seal lip 21. Because of this, the lip-pressing ring 40 moving in the axis-x direction can be suppressed and a stability of an installation position of the lip-pressing ring 40 in the usage state can be improved.

Furthermore, because the lip-pressing ring 40 is of a separate material than the seal lip 21, it does not inhibit a desired movement of the seal lip 21.

As described above, according to the sealing apparatus 1 according to the present embodiment, in the usage state, the lip-pressing ring 40 contacts the seal lip 21 from the outer-periphery side; therefore, the spread of a portion of the seal lip 21 to the outer-periphery side due to misalignment of the rotary shaft 50 and a gap forming between the rotary shaft 50 and the seal lip 21 on the opposite side can be suppressed. Because of this, a sealing performance of the seal lip 21 can be improved. Particularly, even in a situation where the seal lip 21 becomes brittle in a usage state at a low temperature and the tension force of the seal lip 21 against the rotary shaft 50 imparted to the seal lip 21 by the garter spring 30 decreases, the tracking of the rotary shaft 50 by the seal lip 21 can be maintained by the lip-pressing ring 40.

In this manner, according to the sealing apparatus 1 according to the present embodiment, a decrease in tracking the rotary shaft 50 can be suppressed.

An embodiment of the present disclosure is described above, but the present disclosure is not limited to the sealing apparatus 1 according to the embodiment of the present disclosure above and includes all aspects included within the concept of the present disclosure and the scope of claims. Moreover, configurations may be selected and combined as appropriate so at least a portion of the object and effects described above is exhibited. For example, shapes, materials, dispositions, sizes, and the like of the components in the embodiment above can be changed as appropriate according to specific usage aspects of the present disclosure.

Specifically, forms of the reinforcing ring 10 and the elastic-body portion 20 may be other forms. Moreover, the elastic-body portion 20 may be one provided with no dust lip 24.

Furthermore, while the sealing apparatus 1 according to the present embodiment is applied to an automobile engine, the application object of the sealing apparatus according to the present disclosure is not limited thereto; the present disclosure is applicable to all configurations that can utilize the effects exhibited by the present disclosure, such as a rotary shaft of another vehicle, a general-purpose machine, or an industrial machine.

REFERENCE SIGNS LIST

1, 100 Sealing apparatus
10, 101 Reinforcing ring
11 Cylindrical portion
12 Flange portion
20, 102 Elastic-body portion
21, 103 Seal lip
22, 105 Lip tip portion
23, 106 Receiving groove
24, 104 Dust lip
25 Lip base portion
26 Rear cover
27 Gasket portion
28 Seal lip outer-peripheral surface
29 Protruding portion
30, 107 Garter spring
40 Lip-pressing ring
41 Ring inner-peripheral surface
42 Ring outer-peripheral surface
50 Rotary shaft
51 Housing
52 Through hole
x Axis
φL Outer diameter
φR Inner diameter

The invention claimed is:

1. A sealing apparatus, comprising: a reinforcing ring that is annular around an axis; an elastic-body portion that is provided with a seal lip, is installed to the reinforcing ring, is formed from an elastic body, and is annular around the axis; an annular garter spring; and a lip-pressing ring that is an annular member independent of the garter spring; wherein the seal lip has on an inner-periphery side a lip tip portion that is an annular portion that is convex toward the axis and on an outer-periphery side a receiving groove that is an annular groove formed facing away from the lip tip portion; the garter spring is embedded in the receiving groove of the seal lip; and the lip-pressing ring is made from one of metal or resin and is configured so the seal lip inserted into a space on an inner-periphery side of the lip-pressing ring so that the lip-pressing ring is installed around the seal lip separate from the garter spring, the lip-pressing ring has an inner diameter that is larger than an outer diameter surface of the seal lip when the seal lip is in an uninstalled condition and the lip pressing ring is in engagement with the seal lip in an operating condition spaced to a side of the annular garter spring.

2. The sealing apparatus according to claim 1, wherein the seal lip is connected to another portion of the elastic-body portion at an end portion on one side in an axis direction, the value of the inner diameter of the lip-pressing ring being no less than a value of an outer diameter of the seal lip at a portion at least partway toward the one side from another side in the axis direction.

3. The sealing apparatus according to claim 1, wherein the lip-pressing ring is a member that is annular around an axis of the lip-pressing ring.

4. The sealing apparatus according to claim 1, wherein the inner diameter of the lip-pressing ring is set so the inner-periphery side of the lip-pressing ring contacts the outer-periphery side of the seal lip before the seal lip is spread to the outer-periphery side by a distance corresponding to an interference of the seal lip.

5. The sealing apparatus according to claim 4, wherein the inner diameter of the lip-pressing ring is set so the inner-periphery side of the lip-pressing ring contacts the outer-periphery side of the seal lip in a usage state.

6. The sealing apparatus according to claim 1, wherein in a cross section at the axis, at least a portion of an outline on the inner-periphery side of the lip-pressing ring corresponds to at least a portion of an outline on the one side of the receiving groove on the outer-periphery side of the seal lip.

* * * * *